United States Patent
Jewell et al.

[11] 3,903,560
[45] Sept. 9, 1975

[54] WINDSHIELD WIPER REFILL

[75] Inventors: David E. Jewell, Littleton; Paul D. Schlegel, Boulder, both of Colo.

[73] Assignee: The Gates Rubber Company, Denver, Colo.

[22] Filed: Dec. 11, 1974

[21] Appl. No.: 531,658

[52] U.S. Cl. ............ 15/250.42; 15/250.36; 264/150
[51] Int. Cl.² ........................................ B60S 1/38
[58] Field of Search ...... 15/250.36–250.42; 264/150

[56] References Cited
UNITED STATES PATENTS

| | | | |
|---|---|---|---|
| 2,039,716 | 5/1936 | Horton | 15/250.40 |
| 2,128,454 | 8/1938 | Cullin | 15/250.36 |
| 2,179,451 | 11/1939 | Horton | 15/250.40 |
| 2,306,946 | 12/1942 | Horton et al. | 15/250.40 |
| 3,820,188 | 6/1974 | Moorhead | 15/250.42 |

*Primary Examiner*—Peter Feldman
*Attorney, Agent, or Firm*—Curtis H. Castleman, Jr.; Raymond Fink; H. W. Oberg, Jr.

[57] ABSTRACT

A windshield wiper refill is disclosed comprising a flexible wiping member together with an elongate backing member of non-uniform cross-section along its length and having a pair of end protrusions which extend laterally outwardly and downwardly from the backing member body to define stop portions for the end(s) of the wiping member during its operative use on a windshield.

11 Claims, 11 Drawing Figures

PATENTED SEP 9 1975 3,903,560

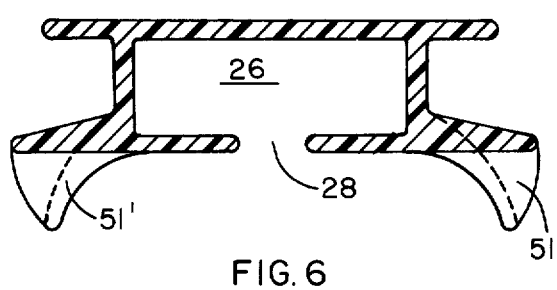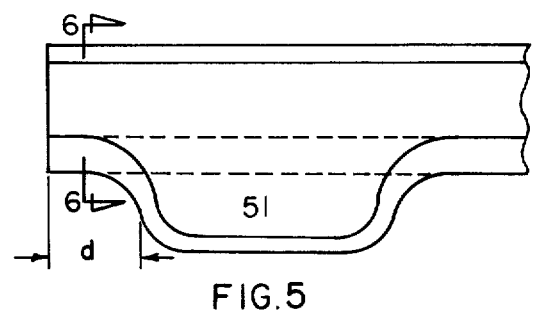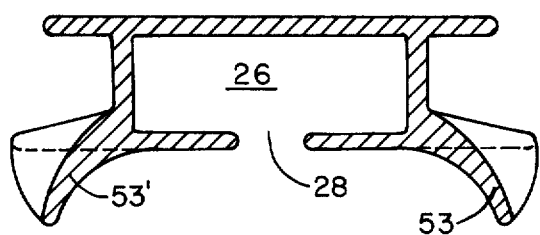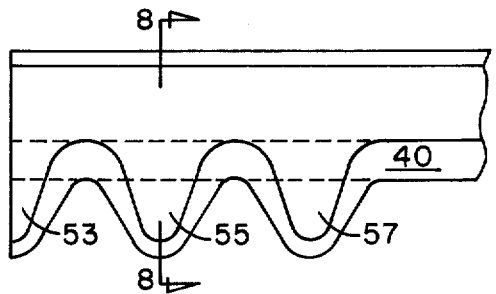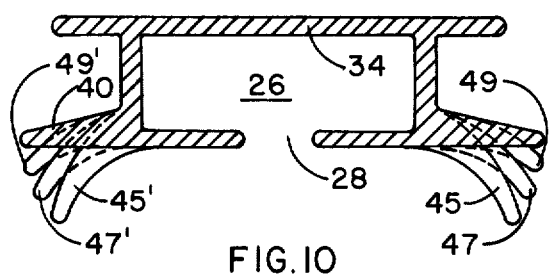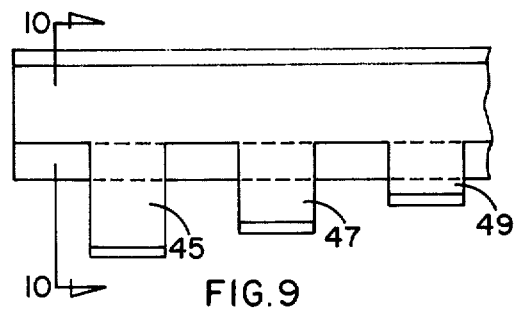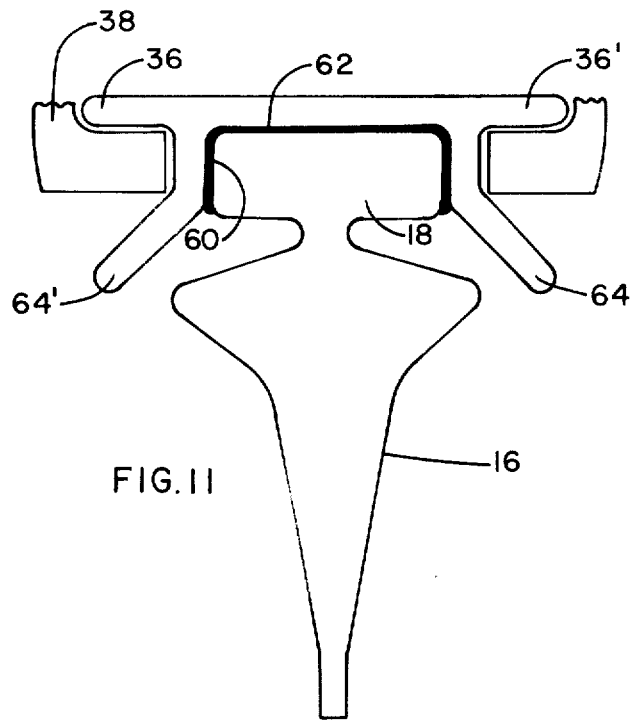

WINDSHIELD WIPER REFILL

BACKGROUND OF THE INVENTION

This invention relates to windshield wiper blades and particularly to the refill associated with such blades which includes the flexible wiping member together with the backing member with which it is in operative association.

As has been recognized for some time, a prevalent failure mode for windshield wiper blades is wearing out of the squeegee wiping member usually along its reduced hinge portion at its end extremities. The thin reduced neck portion of the squeegee, because it is normally subjected to significant bending stresses especially at its ends, oftentimes tear after only moderate use, necessitating its replacement. An allied problem originating at the end extremities of the squeegee is the problem of loss of flipping of the squeegee. In this latter case, the combination of wiper arm loading and extreme lay-over of the squeegee at the end of its sweep (whether during cycling or stationary in the parked position) may prevent the squeegee from flipping over as the wiper arm begins to follow the reverse direction across the windshield surface.

One solution to the above-mentioned problems involves strengthening the ends of the squeegee by increasing its cross-section, particularly at the reduced neck portion. While this is a satisfactory solution, it increases squeegee fabrication costs since each squeegee must be molded to length and precludes use of extruded squeegees or use of slab molding techniques. Another attempted solution has been to employ a separate secondary supporting member directly attached to the squeegee and straddling the squeegee to permit limited rocking motion near the ends of the squeegee.

The subject invention has for its primary object the provision of means for increasing the life of the end extremities of the squeegee by use of a very simple construction which readily accommodates either use of extruded squeegees or extruded backing members, if desired.

SUMMARY OF THE INVENTION

Briefly described, the improved refill of the invention includes an elastomeric flexible wiping member having a body portion terminating in a wiping lip and a retention portion joined to the body by a reduced neck. The retention portion of the squeegee registers in the housing of a channeled-type backing strip of non-uniform cross-section along its length. The backing member also includes means for slidably (preferably) receiving portions of a windshield wiper super-structure longitudinally with respect to the backing member, and a pair of protrusions integral with the channeled housing and extending laterally outwardly and downwardly therefrom and located substantially at an end extremity of the backing member. The protrusions limit by intimate contact therewith endwise laying down of the body portion of the wiping member during operative use of the refill in a windshield wiper, permitting continued flipping of the squeegee during use. The protrusions during non-operative use of the refill (i.e., when the wiper blade is freely disposed and is not attached to its associated wiper arm nor engaging a windshield) are normally and preferably free from contact with the wiping member.

The invention in another aspect is drawn to the backing member itself, and the combination of the refill in a windshield wiper device.

BRIEF DESCRIPTION OF THE DRAWINGS

Preferred aspects of this invention will be described with reference to the accompanying drawings, in which like numerals designate like parts in the several figures, and wherein:

FIGS. 5, 7 and 9 depict alternative embodiments of backing members according to the invention and FIGS. 6, 8 and 10 are respective cross-sectional views taken along lines 6—6, 8—8, and 10—10; and FIG. 11 is an end view of an alternative embodiment of the invention.

PREFERRED EMBODIMENTS OF THE INVENTION

Figure 2:
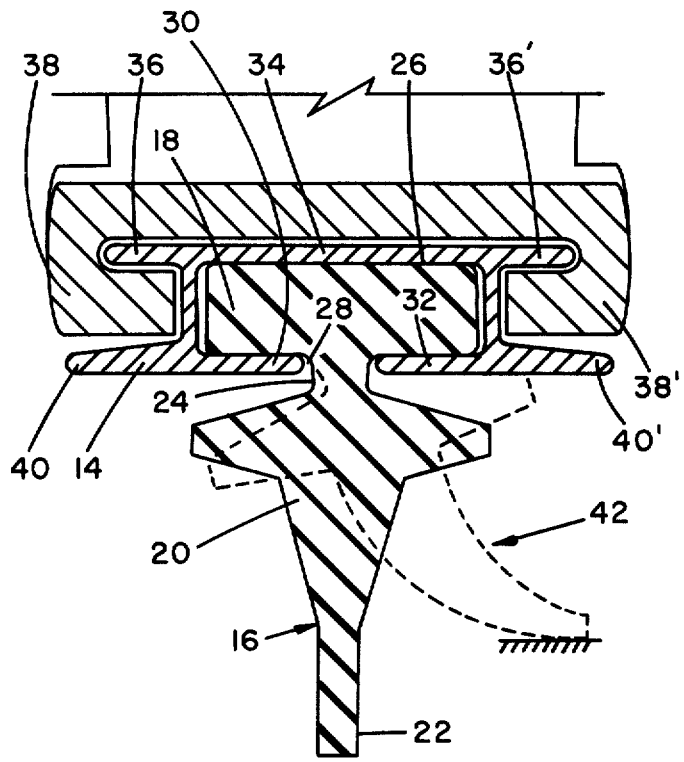
FIG. 2 is a view taken along section 2—2 of FIG. 1.
Figure 1:
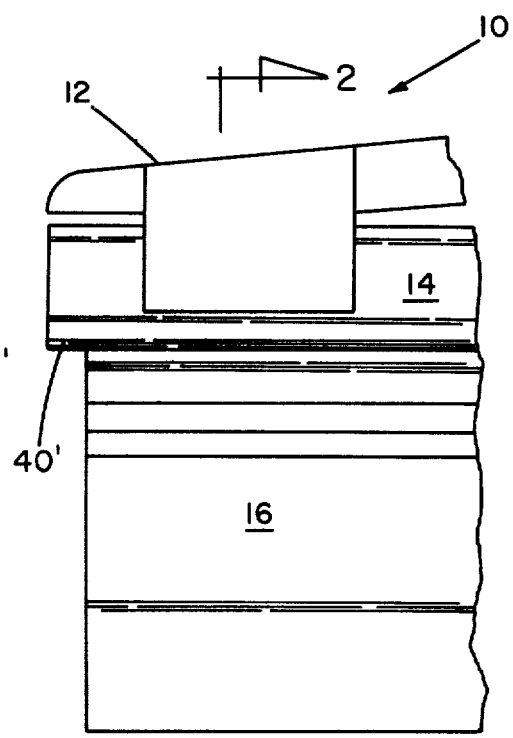
FIG. 1 is a fragmentary side view of an end extremity of a prior art refill in association with the claws of a pressure-distributing superstructure.

Referring to the drawings, a wiper assembly which may be used in conjunction with the windshield of an automobile, for instance, is generally designated at 10 and includes a superstructure 12 pivotally connected to an actuating wiper arm (not shown), and a refill including a backing member 14 together with an elastomeric flexible wiping member 16.

The elastomeric flexible wiping member 16 includes a body portion 20 terminating in a wiping lip 22 and having a retention portion 18 joined to the body by a reduced neck 24. The retention head 18 of the squeegee is contained within an elongate housing 26 defined by the sides of the tubular or channeled configuration of the backing member 14. The reduced neck 24 of the squeegee emerges from the housing through a slot 28 defined by opposed inwardly directed flanges 30, 32.

The top of the backing member is defined by a connecting bridge portion 34 which may be generally flat, as shown, or of hooded or domed shape, for instance. The bridge carries juxtaposed flanged projections 36, 36' about which claws 38, 38' of the superstructure embrace. Optional lower flanges 40, 40' define, together with upper flanges 36, 36' longitudinally extending grooves or channels for slidably receiving the claws of the superstructure. The claws transmit pressure from the superstructure to the wiping element in the usual manner. The backing member generally has flexibility in a plane perpendicular to the surface to be wiped.

Figure 4:
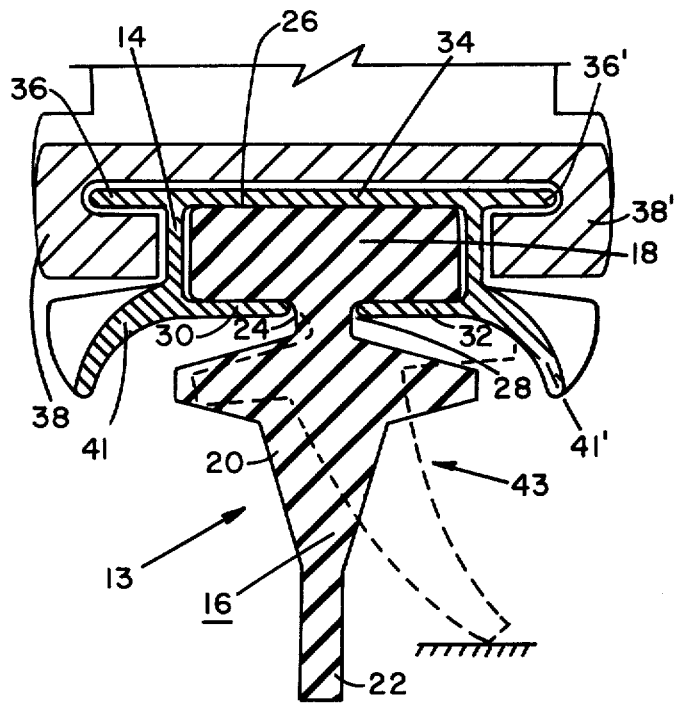
FIG. 4 is a view taken along section 4—4 of FIG. 3.
Figure 3:
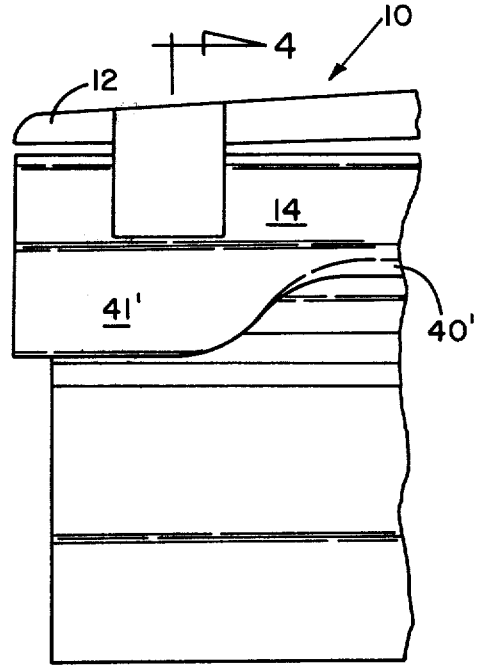
FIG. 3 is a fragmentary side view of the end extremity of a wiper refill in association with a super-structure in accordance with the invention.

According to the invention, either or both of the end extremities of the backing member 14 carry a pair of protrusions 41, 41' extending laterally outwardly and downwardly from the housing of the backing member and which are integral with the housing. In the embodiment of FIGS. 3 and 4 the downwardly and outwardly protruding members 41, 41' are formed, for instance, by bending downwardly the corresponding lower flanges 40, 40' at substantially the ends thereof. During operation of the refill member of FIGS. 3 and 4, the pair of integral protrusions 41, 41' function as stops to limit lateral flex-over of the squeegee below a predetermined critical flipping angle with respect to a plane through the wiper length and normal to the windshield. In this manner, continued flipping of the squeegee during each half cycle of its to and fro oscillation is guaranteed. The squeegee is shown in its restricted stop position at 43, and this is to be contrasted with the corresponding relatively unrestricted conventional position shown at 42 in FIG. 2.

With the tendency of the end extremity of the squeegee to flex over more severely at its ends due to relative lack of support at the position, it is preferred that the lateral and downwardly extending protrusions are formed in such a manner that they offer maximum resistance to flexing at substantially the end extremity of the backing member, and then taper upwardly (either continuously or non-continuously) until a minimum angle with respect to the horizontal is provided inwardly of the extremities of the backing member. A smooth continuous gradation is preferred, and this embodiment is illustrated in FIGS. 3 and 4 wherein the protrusions 41, 41' gradually taper toward the horizontal progressively from the end extremities. This feature of gradation is also illustrated in FIGS. 9 and 10 wherein the plurality of protrusions 45, 47, 49 and 45', 47' and 49' progressively taper and approach the horizontal away from the end extremity area of the backing member.

It will also be appreciated that the outwardly and downwardly extending protrusions of the invention need not be precisely at the end extremity of the backing member as long as the protrusions are substantially opposite the ends of the wiping element. The protrusions can be spaced slightly away from the end as shown in FIGS. 5 and 6 together with FIGS. 9 and 10. Preferably, the protrusions extend within at least about ¾ inch of the end extremity, denoted in FIG. 5 as distance d. The protrusions in FIGS. 5 and 6 are similar to that in FIGS. 3 and 4 with bent-down portions 51, 51'.

An alternative embodiment is shown in FIGS. 7 and 8 in which there are provided a plurality of waves of bent-down protrusions 53, 55, 57 together with their reflections, e.g., 53' on the other side of the backing member.

In the alternative shown in FIG. 11, the backing member housing does not have a longitudinal slot 28 running along its length, as defined by the inward flanges 30, 32 of the remaining figures. Rather, the embodiment of FIG. 11 omits the inwardly directed flanges and utilizes a bonding agent 60 which cojoins the retention portion 18 of the squeegee to the inner periphery of the housing 62 of the backing member. Stop protrusions 64, 64' depend downwardly at the end extremity of the backing member and extend longitudinally inwardly along the backing strip for a short distance (not shown), e.g., for approximately one inch. Due to the omission of the inwardly directed flanges corresponding to members 30, 32 of FIG. 2, together with the elimination of intermediate side flanges corresponding to elements 40, 40', the squeegee in this embodiment has considerably more freedom to flex laterally during its operation and therefore it becomes even more important to employ the extending protrusions 64, 64' at the end of the backing member. The bonding agent will be selected based on the backing strip material to which the squeegee is to be joined. As an example, cyanoacrylate has been found to be a suitable, quick-drying adhesive for joining rubber squeegees to polycarbonate backing members and produces a desirable rubber-tearing bond.

The squeegee members discussed in accordance with this invention can be formed of a conventional natural or synthetic rubber or other elastomeric material which may be fabricated by a molding or extruding operation, as discussed previously. The backing member may be made of a light metal material which permits its flexibility in a plane normal to the surface to be wiped, or alternatively can be formed of a plastic extrusion or molding. In the event plastic material is used as a backing member, it may be extruded in the form similar to that shown in FIG. 2, cut to desired lengths, and then the protrusions formed by a simple bending or other deforming (e.g., punching or rolling) operation with or without the aid of heat. It has been found in the case of plastics that after the bending operation is completed, an additional treatment is required to stress relieve the backing member and prevent it from forming stress cracks during operation thereof, particularly for resistance to various chemically degrading windshield washer solutions. The stress relieving or annealing operation is accomplished by a heat treatment whose temperature and time of exposure will depend on the particular plastic blend utilized and sufficient to relax the stresses within the material. The annealing medium is preferably oil or air. Typical plastic materials that may be used for the backing member in this respect and which benefit from the stress relieving operation include polycarbonate, acetal and nylon. Preferred stress relieving temperatures in most cases are from about 200° to about 290°F. at 10 to about 30 minutes exposure time.

It will be understood that the bent-down flange or protrusions of the subject invention need not necessarily be unitary or integral with the backing strip, although this is preferred for simplicity and economic reasons. It is further understood that the bent-down flange or protrusion is normally and preferably free from contact with the squeegee such as shown at position 13 of FIG. 4 when the blade is not being operated or intermediate the flipping of the squeegee from one side to the other. However, during operation of the wiper the squeegee will come into direct stopping contact with the protrusions of the invention and restrict its further lateral flexing as shown at position 43.

It will be understood that the invention is capable of a variety of modifications and variations which will become apparent to those skilled in the art upon a reading of this specification, and which are intended to be included within the scope of the claims appended hereto.

What is claimed is:

1. A windshield wiper blade refill adapted to engage a pressure transmitting superstructure comprising:
   an elastomeric flexible wiping member having a body portion terminating in a wiping lip and a retention portion joined to the body by a reduced neck;
   an elongate backing member of non-uniform cross-section adapted to be associated with a pressure distributing superstructure, said backing member comprising a housing in which is engaged the retention portion of the squeegee with the body portion of the squeegee disposed beneath the housing, means for engaging portions of the superstructure for transmission of pressure therefrom, and a pair of protrusions integral with the housing and extending laterally outwardly and downwardly therefrom and located substantially at an end extremity of the backing member;

said protrusions limiting by intimate contact therewith endwise laying down of the body portion of the wiping member during operative use of the refill on a windshield thereby permitting continued flipping of the squeegee during use.

2. The refill of claim 1 wherein the housing contains a slot within which the reduced neck of the squeegee is disposed.

3. The refill of claim 1 wherein the housing has a pair of flanges extending laterally outwardly therefrom continuously along the housing intermediate said protrusions.

4. The refill of claim 3 wherein the housing has a second pair of flanges extending laterally outwardly from the housing and spaced above the first mentioned pair of flanges to form a longitudinal channel constituting said means for engaging portions of the superstructure.

5. The refill of claim 1 in combination with a pressure transmitting superstructure.

6. The refill of claim 1 wherein the wiping member is cojoined with the inner peripheral surface of the housing by a bonding agent.

7. The refill of claim 1 wherein the protrusions are tapered gradually from a maximum angle with the horizontal at said end extremities to a minimum angle with the horizontal inward of said end extremities.

8. The refill of claim 1 wherein said protrusions during non-operative use of the refill are normally free from contact with the wiping member.

9. In an elongated backing member for retention of a wiping element in a windshield wiping device, said backing member comprising a housing for receipt of a retention portion of the wiping element, and means for engaging claws of a superstructure for transmitting pressure to the wiping element through the backing member, the improvement comprising integral protrusions disposed sidewardly and downwardly from said housing and located substantially at an end extremity of said housing, said housing being free of said protrusions inwardly of the end extremity adapted and arranged so that the end(s) of the wiping element when engaged in the housing will be restricted in flex-over angle by the protrusions at the end extremities of the backing member.

10. The backing member of claim 9 wherein a pair of flanges extend laterally outwardly from said housing, that portion of the flanges opposite said end extremities of the housing being bent downwardly to define said integral protrusions.

11. The backing member of claim 10 wherein the protrusions are comprised of portions bent more downwardly near the end extremities of the housing and portions inward of the end extremities which are bent less downwardly.

* * * * *